(12) United States Patent
Mikan et al.

(10) Patent No.: US 7,747,535 B2
(45) Date of Patent: Jun. 29, 2010

(54) USER TERMINAL AND WIRELESS ITEM-BASED CREDIT CARD AUTHORIZATION SERVERS, SYSTEMS, METHODS AND COMPUTER PROGRAM PRODUCTS

(75) Inventors: Jeffrey Clinton Mikan, Atlanta, GA (US); Fulvio Arturo Conciarelli, Suwanee, GA (US); Kenneth D. Heil, Marietta, GA (US); John Erwin Lewis, Lawrenceville, GA (US); Justin Michael McNamara, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/253,720

(22) Filed: Oct. 17, 2008

(65) Prior Publication Data

US 2010/0100486 A1 Apr. 22, 2010

(51) Int. Cl.
*G06Q 20/00* (2006.01)
(52) U.S. Cl. .......................................... 705/64; 705/67
(58) Field of Classification Search .................. 705/64, 705/67
See application file for complete search history.

(56) References Cited

U.S. PATENT DOCUMENTS

| | | | |
|---|---|---|---|
| 6,612,488 B2 | 9/2003 | Suzuki | |
| 6,913,194 B2 | 7/2005 | Suzuki | |
| 7,104,444 B2 | 9/2006 | Suzuki | |
| 2005/0033653 A1* | 2/2005 | Eisenberg et al. | 705/26 |
| 2008/0162346 A1 | 7/2008 | Aaron et al. | |
| 2008/0164308 A1* | 7/2008 | Aaron et al. | 235/380 |
| 2008/0167980 A1* | 7/2008 | Aaron et al. | 705/35 |
| 2008/0249939 A1* | 10/2008 | Veenstra | 705/44 |

OTHER PUBLICATIONS

Mikan et al., "Systems and Methods Determining Identity and Personal Assistance" U.S. Appl. No. 11/937,354, filed Nov. 8, 2007.

* cited by examiner

*Primary Examiner*—Pierre E Elisca
(74) *Attorney, Agent, or Firm*—Myers Bigel Sibley & Sajovec, P.A.

(57) ABSTRACT

Credit card transaction authorization is performed using ad-hoc, short-range wireless links to obtain item identification information from items that include ad-hoc short range wireless link transmitters and that are carried by a user who is associated with a prospective credit card transaction. Authorization information for the prospective credit card transaction is generated based on the item identification information that was obtained. Location information for a wireless terminal that is associated with the user and/or Internet Protocol (IP) address information for a transaction terminal that is associated with the transaction may also be used. Related systems, devices and computer program products are also described.

17 Claims, 8 Drawing Sheets

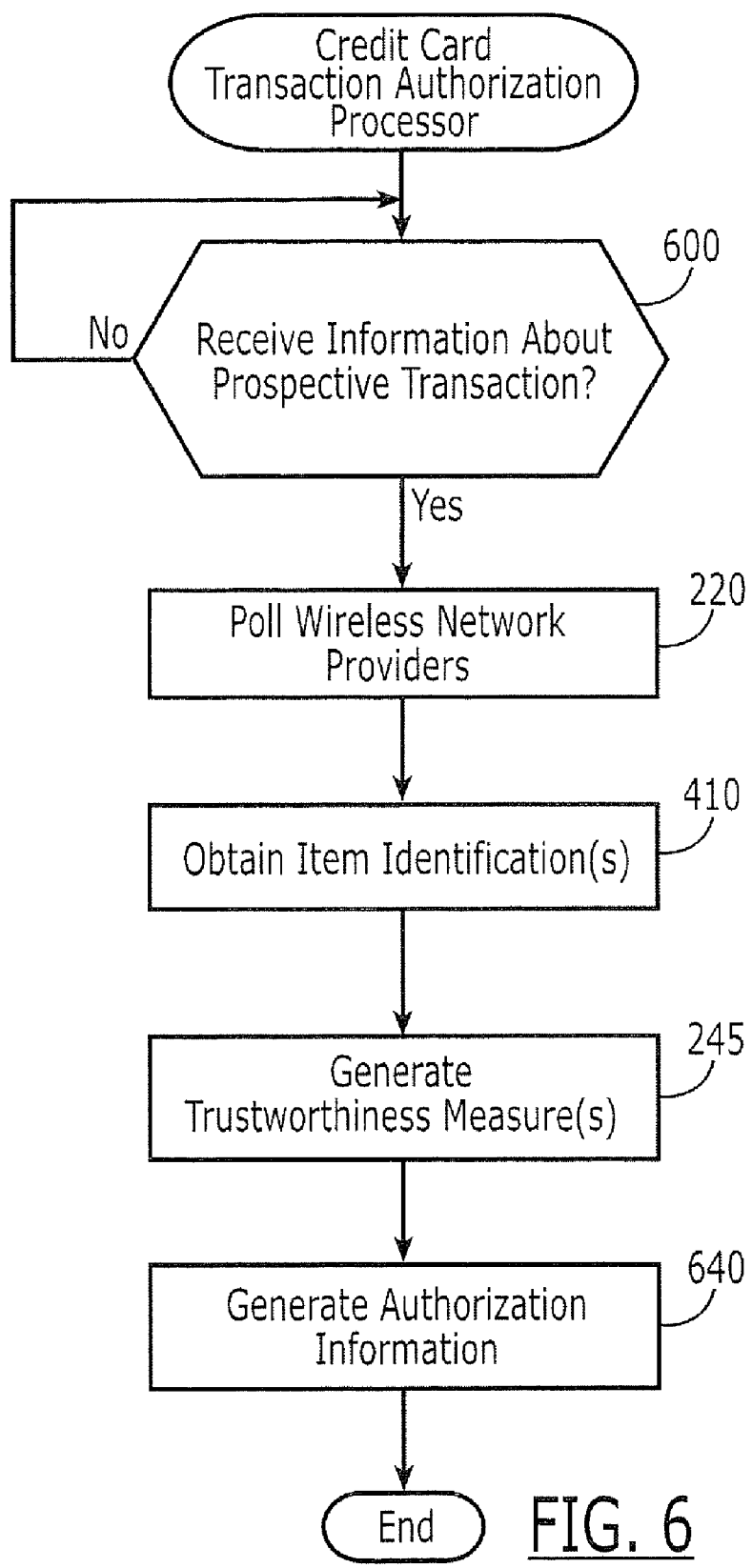

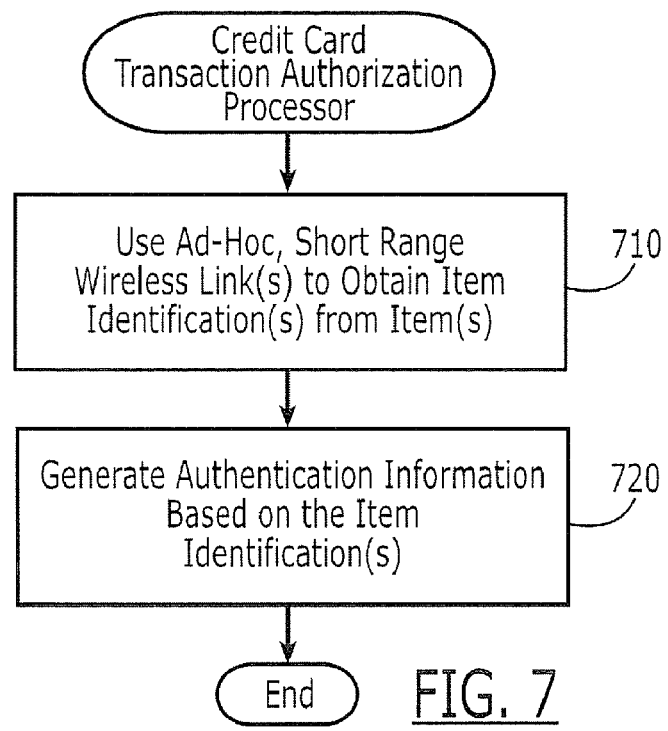
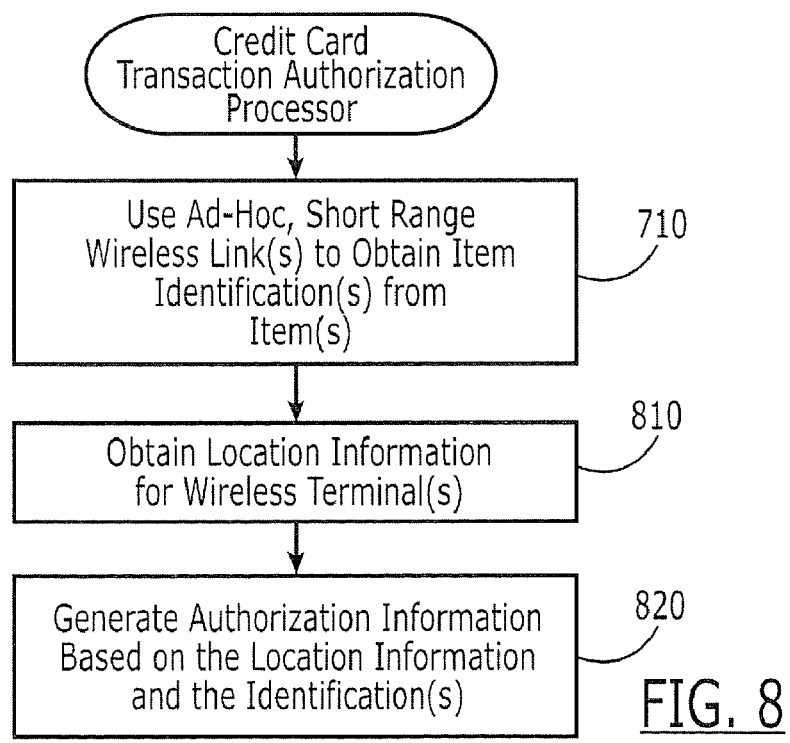

USER TERMINAL AND WIRELESS ITEM-BASED CREDIT CARD AUTHORIZATION SERVERS, SYSTEMS, METHODS AND COMPUTER PROGRAM PRODUCTS

BACKGROUND

This invention relates to computer servers, devices, systems, methods and computer program products, and, more particularly, to credit card transaction authorization servers, systems, devices, methods and computer program products.

Credit cards are widely used for many consumer, commercial and other transactions. As used herein, the term "credit card" includes debit cards and other stored value cards in various form factors, such as wallet-sized, keychain-sized, etc.

Unfortunately, with the proliferation of credit cards, credit card fraud has become all too common. A thief can steal a credit card, and then use it to purchase thousands of dollars of goods and services before the card is denied. Many measures have been provided to reduce the possibility of fraud, including card holder signatures on the credit card, a picture identification on the credit card and/or the requirement for a separate picture identification of a credit card user, security codes printed on the credit card, billing address verification, purchase pattern screening and/or other known techniques.

Notwithstanding these and other measures, credit card fraud continues to be a problem.

SUMMARY

Internet credit card transaction servers, according to some embodiments, include an Internet credit card interface that is configured to receive information about credit card transactions that are associated with a plurality of credit card issuers and that are performed over the Internet. The information includes an Internet Protocol (IP) address that is associated with a user terminal on which an Internet credit card transaction is performed. An IP address location interface is configured to obtain location information corresponding to an IP address. A wireless network interface is configured to obtain location information for a plurality of wireless terminals that are associated with a plurality of wireless network providers. An Internet credit card transaction authorization processor is responsive to receipt of information concerning a prospective Internet credit card transaction with one of the plurality of credit card issuers from the Internet credit card transaction interface, including an IP address of a user terminal that is associated with the prospective Internet credit card transaction. The Internet credit card transaction authorization processor is configured to instruct the IP address location interface to obtain user terminal location information that corresponds to the IP address of the user terminal that is associated with the prospective Internet credit card transaction, to instruct the wireless network interface to obtain wireless terminal location information for a wireless terminal that is associated with a user of the credit card for the prospective Internet credit card transaction, to correlate the user terminal location information and the wireless terminal location information, and to generate authorization information for the prospective Internet credit card transaction based on the user terminal location information and the wireless terminal location information that were correlated.

In other embodiments, the wireless network interface is further configured to obtain item identification information for a plurality of items that are linked to a plurality of wireless terminals by short-range, ad-hoc wireless networks, such as Bluetooth and/or WiFi. In these embodiments, the Internet credit card transaction authorization processor is further configured to instruct the wireless network interface to obtain item identification information for an item that is linked to the wireless terminal that is associated with the user of the credit card for the prospective Internet credit card transaction, to correlate the user terminal location information, the wireless terminal location information and the item identification information, and to generate authorization information for the prospective Internet credit card transaction based on the user terminal location information, the wireless terminal location information and the item identification information that were correlated.

In some embodiments, the Internet credit card transaction authorization processor is configured to generate authorization information for the prospective Internet credit card transaction that indicates a trustworthiness measure that is proportional to proximity of the user terminal and the wireless terminal to one another. In other embodiments, the Internet credit card authorization processor is further configured to instruct the Internet credit card transaction interface to obtain additional identification information from the user of the credit card if the user terminal and the wireless terminal are sufficiently distant from one another. In yet other embodiments, the Internet credit card transaction authorization processor is further configured to instruct the Internet credit card transaction interface to obtain additional identification information from the user of the credit card via the wireless terminal in response to the user terminal and the wireless terminal being sufficiently distant from one another.

In other embodiments, the Internet credit card transaction authorization processor is configured to generate authorization information for the prospective Internet credit card transaction that indicates a trustworthiness measure that is proportional to proximity of the user terminal and the wireless terminal to one another and is further proportional to a number of items for which item identification information was obtained. In still other embodiments, the Internet credit card transaction authorization processor is further configured to instruct the wireless network interface to obtain item identification information for the item that is linked to the wireless terminal that is associated with the user of the credit card for the prospective Internet credit card transaction in response to the user terminal location and the wireless terminal location being sufficiently distant from one another. In still further embodiments, the Internet credit card transaction authorization processor is further configured to instruct the wireless network interface to obtain item identification information for the item that is linked to the wireless terminal that is associated with a user of the credit card for the prospective Internet credit card transaction via the wireless terminal.

Credit card transaction servers according to other embodiments include a credit card interface that is configured to receive information about credit card transactions that are associated with a plurality of credit card issuers. A wireless network interface is configured to obtain location information for a plurality of wireless terminals that are associated with a plurality of wireless network providers and to obtain item identification information for a plurality of items that are wirelessly linked by short-range, ad-hoc wireless networks. A credit card transaction authorization processor is responsive to receipt of information concerning a prospective credit card transaction with one of the plurality of credit card issuers from the credit card transaction interface. The credit card transaction authorization processor is configured to instruct the wireless network interface to obtain wireless terminal location information for a wireless terminal that is associated with a user of the credit card for the prospective credit card transaction, to obtain item identification information for an item that is associated with the user of the credit card for the prospective credit card transaction and to generate authorization information for the prospective credit card transaction based on the wireless terminal location information and the item identification information.

In other embodiments, the credit card transaction authorization processor is configured to generate authorization information for the prospective credit card transaction that indicates a trustworthiness measure that is proportional to proximity of a credit card transaction terminal and the wireless terminal to one another and is further proportional to a number of items for which item identification information was obtained. In still other embodiments, the credit card transaction authorization processor is further configured to instruct the wireless network interface to obtain the item identification information for an item that is associated with the user of the credit card for the prospective credit card transaction in response to the credit card transaction terminal and the wireless terminal being sufficiently distant from one another. In still other embodiments, the credit card transaction authorization processor is further configured to instruct the wireless network interface to obtain item identification information for the item that is associated with the user of the credit card for the prospective credit card transaction via the wireless terminal.

Credit card transaction authorization methods according to various embodiments of the invention include using an ad-hoc, short-range wireless link to obtain item identification information from an item that includes an ad-hoc short range wireless link transmitter and that is carried by a user who is associated with a prospective credit card transaction. Authorization information for the prospective credit card transaction is generated based on the item identification information that was obtained.

Other embodiments further include obtaining location information for a wireless terminal that is associated with the user. Still other embodiments include obtaining Internet Protocol (IP) address location information for a transaction terminal that is associated with the transaction. Yet other embodiments include obtaining location information for a transaction terminal that is associated with the transaction. In any of these embodiments, the transaction terminal may be a merchant point-of-sale terminal or a user terminal having Internet access. In still other embodiments, the ad-hoc, short-range wireless link extends between the item and a wireless terminal that is associated with the user, a merchant point-of-sale terminal that is associated with the prospective credit card transaction and/or a terminal having Internet access that is associated with the user.

It will be understood that various server and method embodiments have been described above. However, analogous device, system and computer program embodiments also may be provided according to other embodiments of the invention. Moreover, the various embodiments of the invention that are described herein may be combined in various combinations and subcombinations.

Other systems, methods, and/or computer program products according to various embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 6 is a flowchart of operations that may performed for credit card transactions authorization according to still other embodiments.

FIGS. 7-9 are flowcharts of operations that may be performed during credit card transaction according to various embodiments.

DETAILED DESCRIPTION OF THE INVENTION

Figure 1:
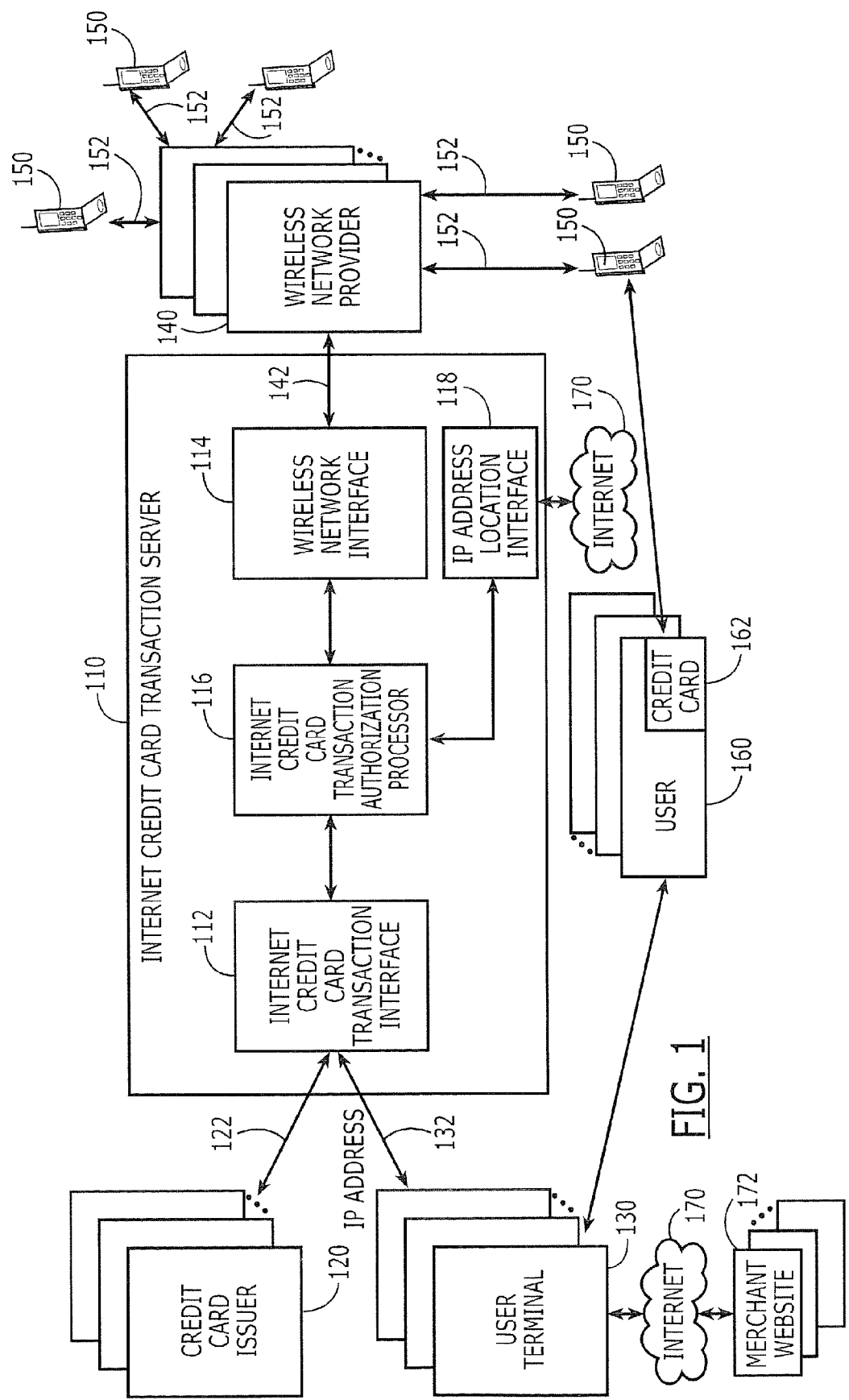
FIG. 1 is a block diagram of Internet credit card authorization servers, systems, devices, methods and computer program products according to various embodiments.

Exemplary embodiments now will be described more fully hereinafter with reference to the accompanying figures, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, third, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products according to exemplary embodiments. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that runs on a processor such as a digital signal processor, collectively referred to as "circuitry" or "a circuit". Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

FIG. 1 is a block diagram of Internet credit card transaction servers, systems, devices, methods and/or computer program products according to various embodiments. Referring now to FIG. 1, an Internet credit card transaction server 110 includes an Internet credit card transaction interface 112, a wireless network interface 114, an IP Address Location Interface 118 and an Internet credit card transaction authorization processor 116. The Internet credit card transaction server 110 may be embodied as one or more enterprise, application, personal, pervasive and/or embedded computer systems that are connected via a wireless and/or wired, private and/or public network, including the Internet.

The Internet credit card transaction interface 112 is configured to receive information about credit card transactions that are associated with a plurality of credit card issuers 120 and that are performed over the Internet 170. The information about credit card transactions may be obtained directly from the plurality of credit card issuers 120 and/or from user terminals 130 on which a credit card transaction is performed. The information about the credit card transactions may be received from the credit card issuers 120 over private and/or public wired and/or wireless communications links 122 including the Internet, and the information about credit card transactions may be received from the user terminals 130 over private and/or public wired and/or wireless communications links 132 including the Internet. By receiving information about Internet credit card transactions that are associated with a plurality of credit card issuers, the Internet credit card transaction server 110 can provide an authorization clearinghouse for Internet credit card transactions for multiple credit card issuers 120 and merchants, to thereby allow reduced Internet credit card fraud. However, in other embodiments, the server 110 may service a single credit card issuer 120 and/or merchant.

Many embodiments of user terminals 130 may be provided that are capable of performing credit card transactions over the Internet 170. In some embodiments, the user terminal 130 may be a home desktop or laptop computer of a user 160 that is linked to the Internet 170 and that performs Internet credit card transactions by accessing merchant websites 172. In other embodiments, the user terminal may be a wireless terminal of a user 160, such as a cell phone or laptop computer with a wide area and/or short-range wireless capability that also accesses various merchant websites 172 over the Internet 170.

As shown in FIG. 1, the information about the credit card transaction carried over link 132 includes an Internet Protocol (IP) address that is associated with the user terminal 130 on which an Internet credit card transaction is performed. Generally, for an Internet credit card transaction, an IP address may be associated with a user terminal 130. For example, when the user terminal 130 is a home computer of a user 160, an IP address may be associated with the Digital Subscriber Loop (DSL) link and/or cable modem link that provides home Internet service. Moreover, when the user terminal 130 is not located in the user's home, an IP address may be associated with the wide area or short-range network by which the user terminal 130 accesses the Internet. For example, a coffee shop, hotel, airport or other venue at which a user terminal 130 accesses the Internet 170, will also have an IP address associated therewith. Thus, regardless of how the Internet is accessed, an IP address may be associated with the user terminal 130.

Still continuing with the description of FIG. 1, an IP address location interface 118 is configured to obtain location information corresponding to the IP address that was obtained over link 132. In particular, the IP address location interface 118 may use the Internet 170 to obtain a geographic location that approximates the IP address. For example, when the user terminal 130 is at the home of the user 160, the IP address of the DSL/cable link may be used by the IP address location interface 118 to identify an approximate location of the user's home. The DSL/cable Internet service provider may need to be polled to obtain a geographic location that is associated with the particular IP address. Similarly, when the user 160 is linked to the Internet by a wired or wireless link provided by a hotel, coffee shop, airport or other venue, the IP address of this wired and/or wireless link may provide an approximate location for the user. It will be understood that the IP address location interface 118 may need to poll various Internet service providers that have assigned IP addresses to various Internet access points (e.g., home, hotel, coffee shop, airport, etc.), and then may use a geographical information system to correlate with this Internet access point, so as to obtain location information corresponding to the IP address of the user terminal 130 that is performing the Internet credit card transaction. Other techniques may also be used.

Still continuing with the description of FIG. 1, a wireless network interface 114 is configured to obtain location information for a plurality of wireless terminals 150 that are associated with a plurality of wireless network providers 140. The location information may be obtained in response to a specific inquiry related to a prospective credit card transaction and/or may be obtained periodically by the wireless network interface 114 polling the wireless network providers 140 and/or by the wireless network providers 140 periodically providing the location information to the wireless network interface 114. As described in more detail below, the location information may include proximity information. The wireless network providers 140 may communicate with the wireless network interface 114 over one or more private and/or public wired and/or wireless communications links 142 including the Internet. The wireless terminals 150 may communicate with the wireless network providers 140 over one or more wireless links 152 using conventional wireless protocols. As used herein, the term "wireless terminal" (and variants thereof) includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. By providing an interface to multiple wireless network providers 140, location information concerning one or more wireless terminals that are registered to a given user 160 may be obtained, which can be used to reduce credit card fraud as will be described below. However, in other embodiments, the server 110 may serve a single wireless network provider 140. A credit card transaction server that includes a wireless network interface and a credit card transaction interface is described in U.S. Application Publication No. 2008/0162346, published Jul. 3, 2008, to Aaron et al., entitled *User Terminal Location Based Credit Card Authorization Servers, Systems, Methods and Computer Program Products*, the disclosure of which is hereby incorporated herein by reference in its entirety as if set forth fully herein.

Still referring to FIG. 1, an Internet credit card transaction authorization processor 116 communicates with the Internet credit card transaction interface 112, the IP address location interface 118, and the wireless network interface 114. In some embodiments, the Internet credit card transaction authorization processor 116 is responsive to receipt of information concerning a prospective Internet credit card transaction with one of the plurality of credit card issuers 120 (directly and/or via a user terminal 130) from the credit card transaction interface 112, including an IP address of a user terminal 130 that is associated with the prospective Internet credit card transaction. The Internet credit card transaction authorization processor 116 is configured to instruct the IP address location interface 118 to obtain user terminal location information that corresponds to the IP address of the user terminal 130 and to instruct the wireless network interface 114 to obtain location information for at least one wireless terminal 150 that is associated with a user 160 of the credit card 162 for the prospective credit card transaction. The wireless network interface 114 can obtain the location information by polling the wireless network providers 140 and/or by searching pre-stored location information, for instance recently received location information falling within a given or maximum time window for location validity. The Internet credit card transaction authorization processor 116 is also configured to correlate the user terminal location information and the wireless terminal location information, and to generate authorization information for the prospective credit card transaction based on the user terminal location information and the wireless terminal location information that were correlated.

As was noted above, many techniques may be used to determine a location of a user terminal 130 from its IP address. In additional to those techniques described above, in some embodiments, the user terminal 130 may be equipped with a Global Positioning System (GPS) and/or other location based system that can provide its latitude and longitude (and/or other) coordinates. In other embodiments, the user terminal 130 may supply an IP address and the issuer of the IP address may be polled as to its approximate location, e.g., in a hotel, airport, coffee shop or other venue. The name of the venue may be applied to a geographic information system to obtain the location. Geographical information systems, such as Google® Maps or MapQuest®, are well known to those having skill in the art and need not be described further herein. Similarly, many techniques may be used by the wireless network providers 140 to determine a location of a wireless terminal 150. For example, the wireless terminal 150 may include a GPS or other location based system therein. Alternatively, triangulation techniques based on the wireless network cells to which a given wireless terminal 150 is communicating may be used.

Alternatively or additionally, short-range sensing/distance measuring techniques may be used to determine proximity between the wireless terminal 150 and the user terminal 130, without the need to determine their actual geographic locations. For example, the user terminal 130 can use Bluetooth, Wi-Fi and/or other short-range ad hoc wireless links to query the wireless terminal 150 or vice versa. The wireless terminal may then reply with an identification, and the time involved may determine the distance between them. In another example, the ability to set up an ad hoc short-range wireless link, such as Bluetooth, between the wireless terminal 150 and the user terminal 130, may itself provide an indication that the wireless terminal 150 and the credit card transaction terminal are sufficiently close to one another. This determination may be provided to the Internet credit card transaction authorization processor 116 by the user terminal 130 via the Internet credit card transaction interface 112 and/or by the wireless network provider 140 via the wireless network interface 114.

Accordingly, exemplary embodiments that are described herein with respect to locations of at least one wireless terminal 150 that is associated with a user 160 of a credit card 162 for a prospective credit card transaction and a location of a user terminal 130 that is associated with the user 160 of the credit card 162 for the prospective credit card transaction, contemplate the use of proximity information between the at least one wireless terminal 150 that is associated with a user 160 of the credit card 162 for the prospective credit card transaction and the user terminal 130 that is associated with the user 160 of the credit card 162 for the prospective credit card transaction. In some embodiments, there may be no need to separately determine the geographic locations of the at least one wireless terminal 150 and the user terminal 130 if proximity therebetween can be determined separately. Other techniques also may be used.

An Internet credit card transaction server 110 according to some embodiments can service Internet credit card transactions from multiple merchants and multiple credit card issuers 120, and can correlate the location of a user terminal 130 with the location of one or more wireless terminals 150 that are registered to the user 160 of the credit card 162 for the prospective credit card transaction. A location based Internet credit card transaction authorization clearinghouse thereby may be provided that can process requests from multiple credit card issuers 120 and multiple merchants, and can obtain location information from multiple wireless network providers 140. Moreover, added levels of fraud prevention may be provided by obtaining location information for multiple wireless terminals of a given wireless network provider 140 or multiple wireless network providers 140 that are registered to a given user. Accordingly, increased levels of fraud prevention may be provided.

Figure 2:
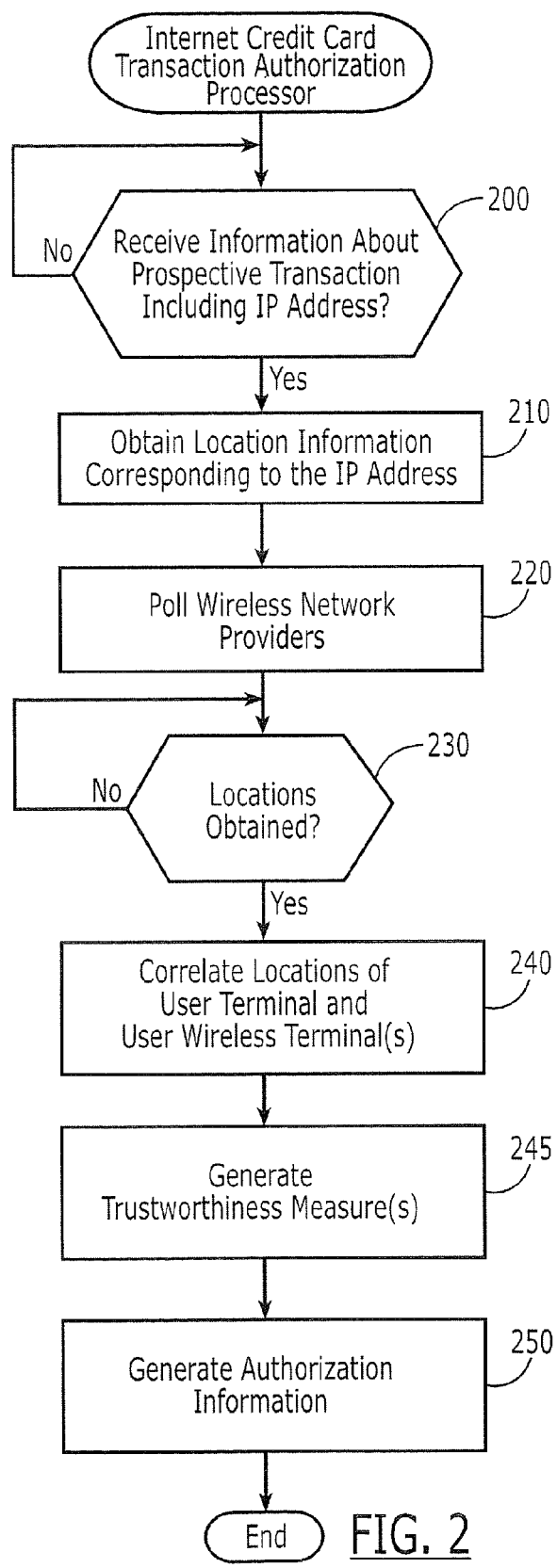
FIG. 2 is a flowchart of operations that may performed for Internet credit card transaction authorization according to various embodiments.

FIG. 2 is a flowchart of operations that may be performed by an Internet credit card transaction authorization processor, such as the Internet credit card transaction authorization processor 116 of FIG. 1, according to some embodiments. Referring now to FIG. 2, at Block 200, a determination is made whether information is received about a prospective credit card transaction. If not, operations can wait. This information may be received by the credit card transaction interface 112 of FIG. 1 via the credit card issuer 120 and/or the user terminal 130 that is associated with the prospective credit card transaction. The information that is received can include a transaction amount, a credit card number, a merchant identification number and/or other conventional information concerning the transaction. The information also includes an Internet Protocol (IP) address that is associated with the user terminal 130 on which the Internet credit card transaction is performed.

Referring now to Block 210, if information about the prospective credit card transaction is received, location information corresponding to the IP address is obtained, for example, by the IP address location interface 118, using any of the techniques that were described above.

Referring now to Block 220, in response to receiving the information about the prospective transaction, the wireless network providers 140 may be polled to provide location information for at least one wireless terminal 150 that is associated with a user 160 of the credit card 162 for the prospective credit card transaction. The polling may take place via communication between the wireless network interface 114 and the wireless network provider 140 over links 142, It will also be understood by those having skill in the art that, in other embodiments, polling need not take place, but, rather, information concerning locations of wireless terminals 150 may be provided periodically by the wireless network providers 140 to the wireless network interface 114, and prestored.

It will also be understood that the wireless network providers 140 may be provided with a name and/or other identifying information of a user 160 that corresponds to the credit card 162 being used for the prospective credit card transaction, and the wireless network providers 140 may use that name and/or other information to identify locations of all wireless terminals 150 that are associated with that name and/or other information. Other conventional electronic commerce techniques may be used to identify the user 160. It also will be understood that embodiments of the invention can allow multiple wireless network providers 140 to be polled or otherwise to provide location information. By allowing multiple wireless network providers 140 to provide location information, enhanced security may be provided. For example, when multiple wireless terminals 150 are registered to a given user 160, the location of all of the wireless terminals 150 may be correlated with the location of the credit card transaction terminal 130 for the prospective credit card transaction. Moreover, especially when wireless terminals 150 for a given user 160 are provided by multiple wireless network providers 140, enhanced security authorization may be obtained to reduce the likelihood that a wireless terminal was registered with another network provider in the user's name by a thief in order to foil or spoof the location based authorization. Such registration with an additional wireless provider, when recent, may be particularly suspicious.

Continuing with the description of FIG. 2, at Block 230, a determination is made whether an identification of location(s) corresponding to the IP address of the user terminal 130 and location information from the wireless network providers 140 has been obtained and/or when the wireless network provider customer databases have been searched for location information. If not, operations can wait. Once the location information has been obtained at Block 230, then at Block 240, the Internet credit card transaction authorization processor 116 correlates the location of the user terminal 130 that is associated with a prospective credit card transaction, and the location(s) of at least one wireless terminal 150 that is associated with a user 160 of the credit card 162 for the prospective credit card transaction. A trustworthiness measure may be generated at Block 245, as will be described in detail below. Finally, at Block 250, authorization information for the prospective credit card transaction is generated based on the locations of the user terminal 130 and the at least one wireless terminal 150 that were correlated, and any other trustworthiness measures that were generated.

Figure 3:
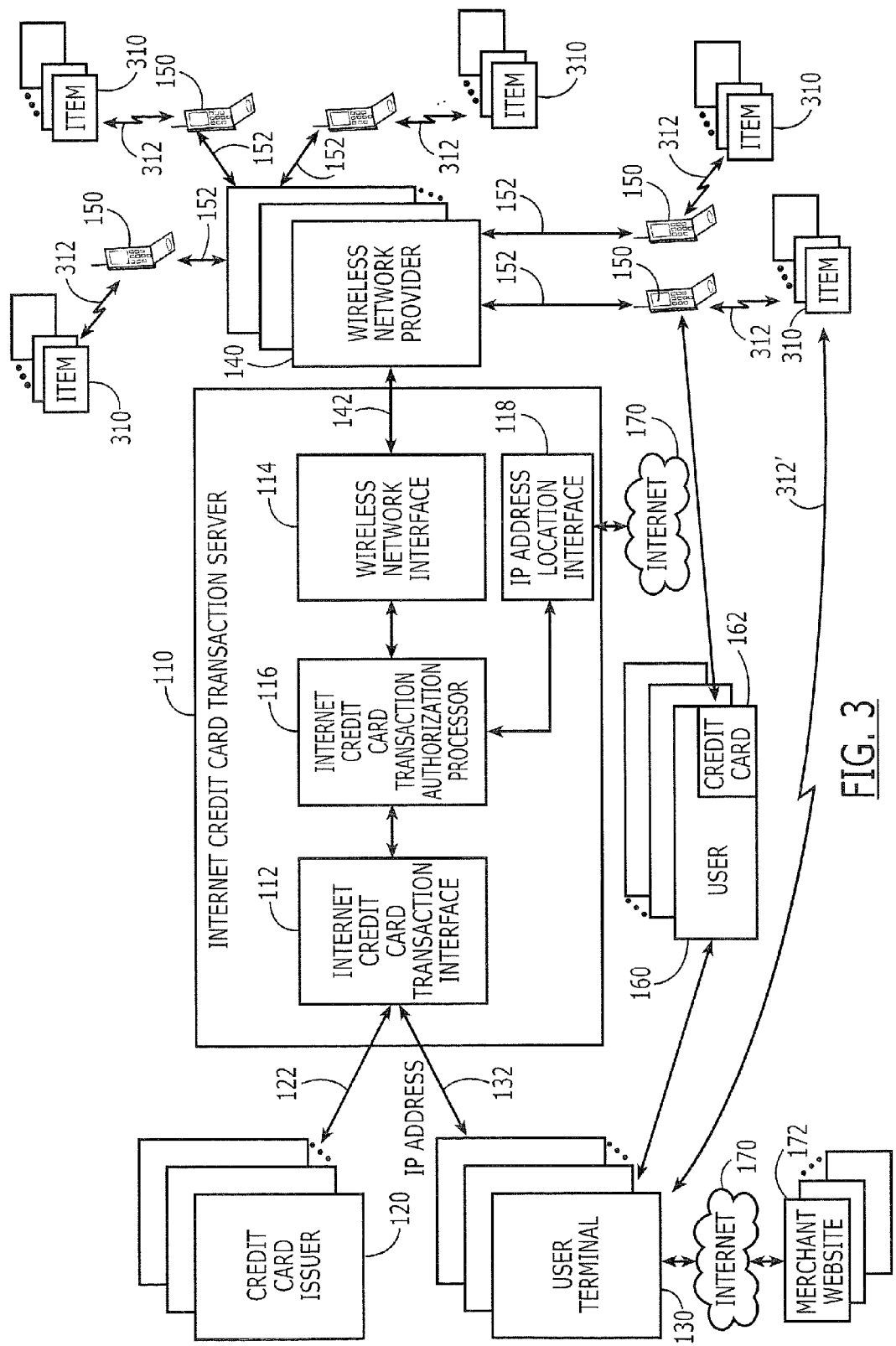
FIG. 3 is a block diagram of Internet credit card authorization servers, systems, devices, methods and computer program products according to other embodiments.

FIG. 3 is a block diagram of Internet credit card transaction servers, devices, systems, methods and/or computer program products according to other embodiments. As shown in FIG. 3, additional security may be provided by obtaining item identification information for a plurality of items 310, also referred to herein as "personal items", that are carried by the user 160 and that support short-range, ad-hoc wireless links 312, such as Bluetooth, RFID and/or WiFi. In particular, unique wireless identifiers are already present in many electronic devices, such as PDAs, laptops, cellular telephones, etc., which commonly possess Bluetooth or WiFi technology. Those items which do not already possess unique wireless identifiers can have them added, for example, using the latest in RFID technology, which can take the form of a "tattoo", which can literally be printed on the surface of an item. This gives the user a vast selection of personal items to use for identification. These personal items can include, but are not limited to, a watch, purse, camera, food item, sunglasses, jewelry, etc. The identification of a user's items that have ad-hoc, short-range wireless links is described in application Ser. No. 11/937,354, filed Nov. 8, 2007, to the present co-inventors Mikan et al., entitled *Systems and Methods for Determining Identity and Personal Assistance*, the disclosure of which is hereby incorporated herein by reference in its entirety as if set forth fully herein.

More specifically, referring to FIG. 3, the wireless network interface 114 is further configured to obtain item identification information for a plurality of items 310 that are linked to a plurality of wireless terminals 150 by short-range, ad-hoc wireless links 312. Moreover, the Internet credit card transaction authorization processor 116 is further configured to instruct the wireless network interface 114 to obtain item identification information for an item that is linked to the wireless terminal 150 that is associated with the user 160 of the credit card 162 for the prospective Internet credit card transaction, to correlate the user terminal location information, the wireless terminal location information and the item identification information, and to generate authorization information for the prospective Internet credit card transaction based on the user terminal location information, the wireless terminal location information and the item identification information that were correlated. It will be understood that in other embodiments, the short-range, ad-hoc wireless links 312' may extend between the personal items 310 and the user terminal 130 or a merchant point-of-sale terminal. In any case, the item identifications that are associated with a user 160 may be obtained.

Figure 4:
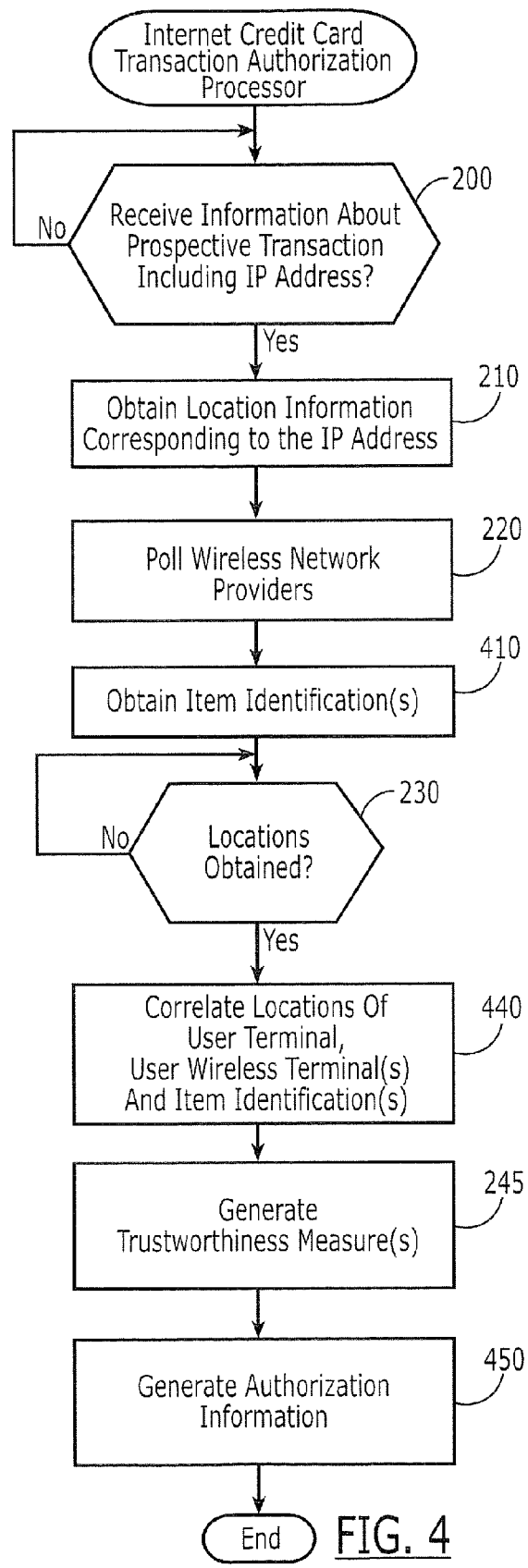
FIG. 4 is a flowchart of operations that may performed for Internet credit card transaction authorization according to other embodiments.

FIG. 4 is a flowchart of operations that may be performed by an Internet credit card authorization processor, such as the Internet credit card authorization processor 116 of FIG. 3, according to some embodiments. As shown in FIG. 4, operations at Blocks 200 and 210 and 220 of FIG. 2 are performed. At Block 410, an item identification information for an item 310 that is associated with the user 160 of the credit card 162 for the prospective Internet credit card transaction is obtained. Operations at Block 230 of FIG. 2 are then performed. At Block 440, the user terminal location information, the wireless terminal location information and the item identification information is correlated. At Block 245, trustworthiness measures are generated. Finally, at Block 450, authorization information for the prospective Internet credit card transaction is generated based on the user terminal location information, the wireless terminal location information, the trustworthiness measures and the item identification information that were correlated.

Additional embodiments of FIGS. 1-4 will now be described. In particular, in some embodiments, the authorization information that is generated at Blocks 250 and/or 450 may also be used to indicate a trustworthiness measure that is proportionate to proximity of the user terminal 130 and the wireless terminal 150 to one another (Block 245). In other embodiments, the item identification 410 of FIG. 4 may only be obtained conditionally if the user terminal 130 and the wireless terminal 150 are sufficiently distant from one another. In still other embodiments, the trustworthiness measure that is generated at Block 245 may be proportional to proximity of the user terminal 130 and the wireless terminal 150 to one another, and may be further proportional to a number of items 310 for which item identification information is obtained.

Figure 5:
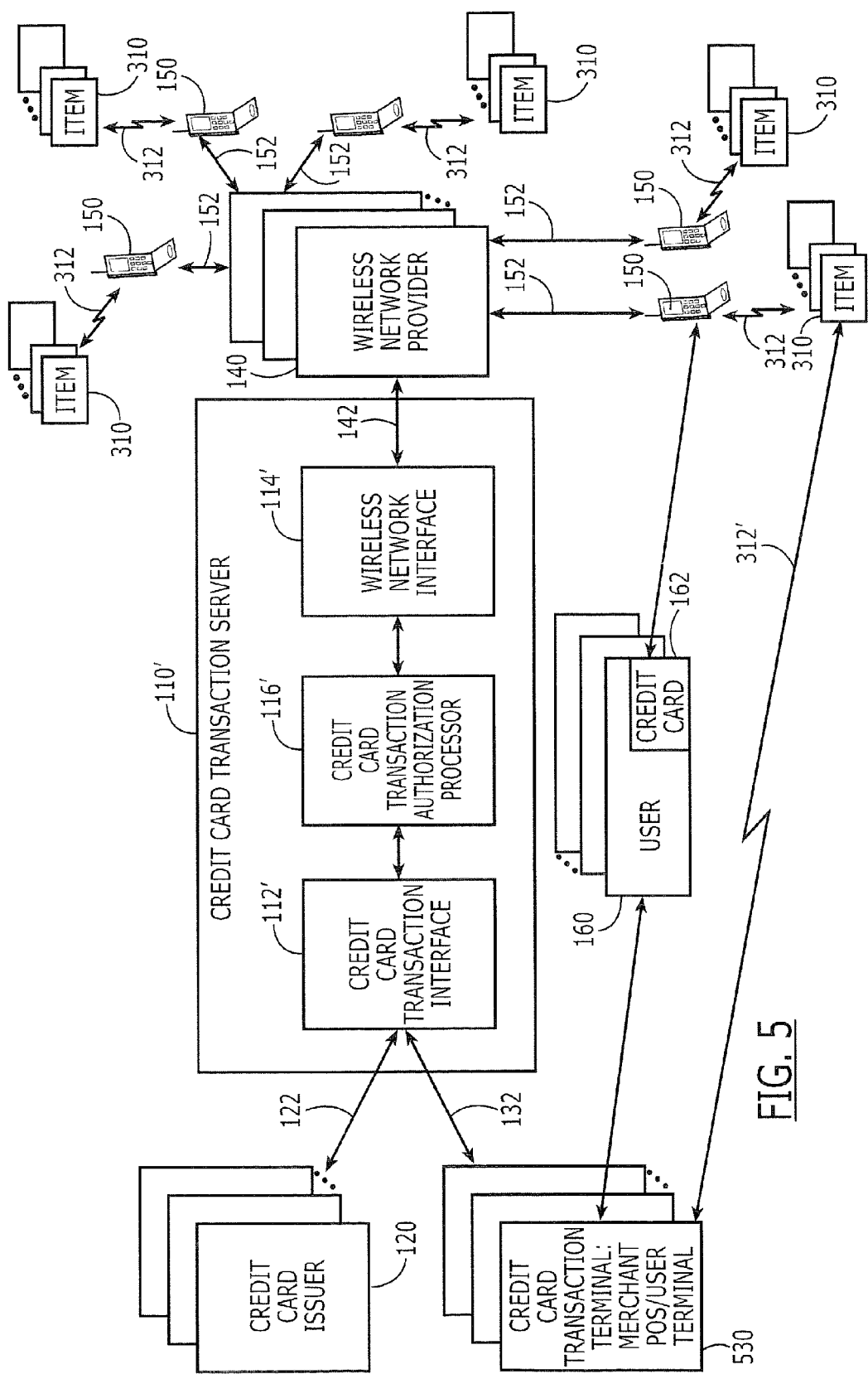
FIG. 5 is a block diagram of credit card authorization servers, systems, devices, methods and computer program products according to still other embodiments.

FIG. 5 is a block diagram of credit card transaction servers, devices, systems, methods and/or computer program products 110' according to various embodiments that may apply to credit card transactions that are performed over the Internet or that performed at conventional credit card transaction terminals, such as point-of-sale terminals at a merchant, without directly using the Internet.

Referring to FIG. 5, a credit card transaction interface 112' is configured to receive information about credit card transactions that are associated with a plurality of credit card issuers 122. A wireless network interface 114' is configured to obtain location information for a plurality of wireless terminals 150 that are associated with a plurality of wireless network providers 140, and to obtain item identification for a plurality of items 310 that are wirelessly linked, for example to a plurality of wireless terminals 150, by short-range, ad-hoc wireless networks 312.

Still referring to FIG. 5, a credit card transaction authorization processor 116' is responsive to receipt of information concerning a prospective credit card transaction with one of the plurality of credit card issuers 120 from the credit card transaction interface 112'. The credit card transaction interface 112' may receive this information from a credit card transaction terminal 530, which may be a conventional point-of-sale terminal that is located at a merchant or may be a user device 130 that is configured to execute an Internet transaction by logging on to a merchant website, as was described in connection with FIGS. 1-4. The credit card transaction authorization processor 116' is configured to instruct the wireless network interface 114' to obtain wireless terminal location information for a wireless terminal 150 that is associated with a user 160 of the credit card 162 for the prospective credit card transaction, to obtain item identification information for an item 310 that is associated with the user 160 of the credit card 162 for the prospective credit card transaction, and to generate authorization information for the prospective credit card transaction based on the user terminal location information and the item identification information. Accordingly, embodiments of FIG. 5 can authorize a credit card transaction by correlating locations of a wireless terminal 150 and item(s) 310 that are associated with a user 160 without the need to correlate to the location of a credit card transaction terminal 530. It will also be understood that the identification of the personal items 310 may also be obtained from short-range, ad-hoc wireless links 312 that extend between the personal items 310 and the wireless terminal 150, wireless links 312' that extend between the personal items 312 and the credit card transaction terminal 530 and/or to another device. Moreover, identification of the personal items 310 may be used for credit card transaction authorization, according to various embodiments, without the need to obtain location information for a wireless terminal 150 and/or a transaction terminal 130/530.

FIG. 6 is a flowchart of operations that may be performed by a credit card transaction authorization processor, such as the credit card transaction authorization processor 116' of FIG. 5, according to various embodiments. As shown in FIG. 6, a determination is made whether information is received about the prospective transaction at Block 600. This information need not include an IP address. If information is not received, operations can wait. Upon receipt, wireless network providers are polled at Block 220, if needed. Item identification information is obtained at Block 410. Trustworthiness measures are generated at Block 245. At Block 640, authorization information is generated based upon the location(s) of the user wireless terminal(s) and the item identifications and/or trustworthiness measures that were obtained.

In some embodiments, the trustworthiness measure of Block 245 is proportional to proximity of a credit card transaction terminal 530 and the wireless terminal 150 to one another, and is further proportional to a number of items for which item identification information is obtained. In still other embodiments, the item identification information of Block 410 may only be obtained in response to the transaction terminal 530 and the wireless terminal 150 being sufficiently distant from one another, which indicates lower trustworthiness. It will also be understood that the identification of the personal item 310 may also be obtained from a short-range, ad-hoc wireless link 312 that extends between the personal items 310 and the wireless terminal 150, credit card transaction terminal 530 and/or another device. Moreover, identification of the personal items 310 may be used for credit card transaction authorization, according to various embodiments, without the need to obtain location information for a wireless terminal 150 and/or a transaction terminal 130/530.

FIG. 7 is a flowchart of operations that may be performed by a credit card authorization processor, such as the credit card authorization processor 116, 116' of FIGS. 3 and 5, respectively, according to various embodiments. Referring to FIG. 7, at Block 710, an ad-hoc, short-range wireless link 312 is used to obtain item identification information from an item 310 that includes an ad-hoc, short-range wireless link transmitter, and is carried by a user 160 that is associated with a prospective credit card transaction. Then, at Block 720, authorization information for the prospective credit card transaction is generated based on the item identification information that was obtained. Thus, in these embodiments, location information for a wireless terminal 150, a user terminal 130 and/or credit card transaction terminal 530 need not be used.

FIG. 8 illustrates other embodiments wherein location information is obtained for a wireless terminal 150 that is associated with the user at Block 810. Authorization information is then generated for the prospective credit card transaction at Block 820, based on the item identification information and the location information that was obtained.

Figure 9:
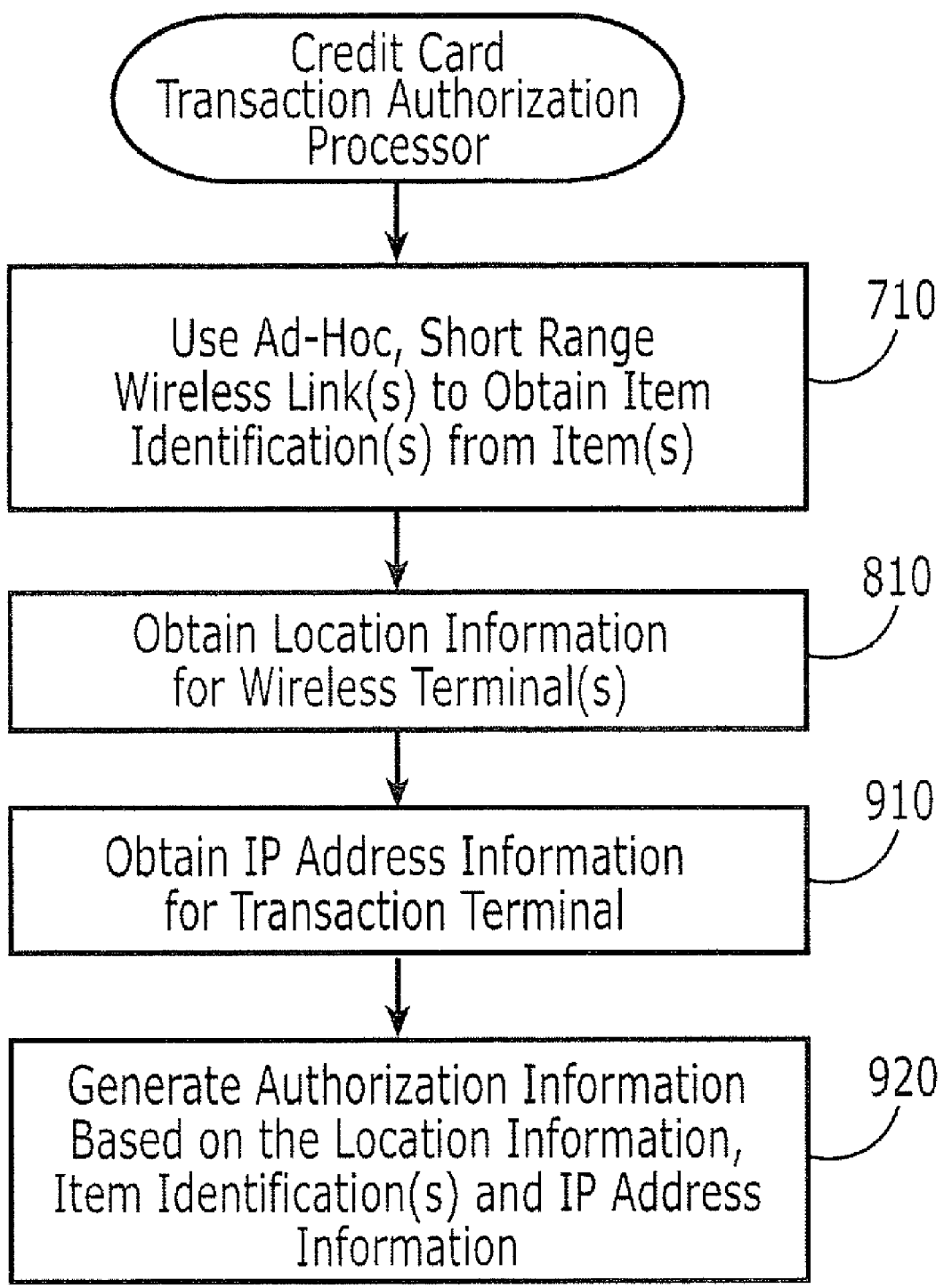

Finally, FIG. 9 illustrates other embodiments wherein IP address information is also obtained for a transaction terminal 530 that is associated with the transaction at Block 910. The transaction terminal 530 may be a merchant point-of-sale terminal and/or a user terminal having Internet access. Then, at Block 920, authorization information is generated based on the location information, the item identification information and the IP address information that was obtained.

Additional discussion of various embodiments will now be provided. According to some embodiments, by using a mobile device's location, credit fraud algorithms may be improved. Thus, for example, if a mobile device is close to the point of the credit charge, then the charge has a higher percent chance of being accurate. These embodiments can also be applied to Internet (online) purchases, since the seller can reverse lookup the location of the user's IP address. Credit card authorizations can also be improved by allowing or entrusting a user to make a credit card purchase if, for example, a predetermined number of items, for example three of five items, that include short-range, ad-hoc wireless connections, are being carried by the user.

More specifically, according to some embodiments, if the user's credit card purchase is over the Internet, a reverse lookup on the IP address can be performed to determine the approximate location. If the Internet purchase is being performed using a mobile terminal, the credit card company may do a location query for the mobile terminal. If the mobile and the store (point-of-sale)/IP (of the user terminal) are proximate to one another, the transaction may become more trustworthy. If the mobile terminal and the store/IP are within X miles, which may vary if the credit card transaction is a store vs. an Internet purchase, the location may be a neutral factor. If the mobile and the store/IP are in drastically different locations, the trustworthiness may drop. The amount of drop may increase as the distance increases. Moreover, as opposed to just modifying the trustworthiness, Internet purchase transactions can then ask for confirmation from the mobile device, for example using text messaging such as SMS/MMS/etc.

In still other embodiments, the user makes a purchase at a store. The store's point-of-sale device performs a query via wireless for devices that are implanted with chips. Upon receiving the local query back, the point-of-sale terminal attaches this to the authorization for the credit company. The credit company can then compare the wireless query with a list of options or required items. If the minimum threshold is met (for example, three of ten items), then the transaction is allowed and marked more trustworthy.

Accordingly, various embodiments can improve the techniques used for detecting false transactions. Moreover, users may add restrictions on future transactions by requiring, for example, a wedding ring, eyeglasses or other type of device (even human implants) to be present. Various embodiments may operate automatically, or may be activated by the credit card company and/or by the user to provide an opt-in/opt-out option. Moreover, polling of the items that are carried by the user may be performed by the user's mobile terminal, by a store point-of-sale terminal and/or by any other ad-hoc, short-range wireless network that is interacting with these items, under control of the user and/or of the credit card company. Moreover, in some embodiments, rather that merely providing an item identification, a private key may be also be transmitted which can reduce the likelihood of hacking.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An Internet credit card transaction server comprising:
   an Internet credit card transaction interface that is programmed to receive information about credit card transactions that are associated with a plurality of credit card issuers and that are performed over the Internet, the information including an Internet Protocol (IP) address that is associated with a user terminal on which an Internet credit card transaction is performed;
   an IP address location interface that is programmed to obtain location information corresponding to an IP address;
   a wireless network interface that is programmed to obtain location information for a plurality of wireless terminals that are associated with a plurality of wireless network providers; and
   an Internet credit card transaction authorization processor that is responsive to receipt of information concerning a prospective Internet credit card transaction with one of the plurality of credit card issuers from the Internet credit card transaction interface, including an IP address of a user terminal that is associated with the prospective Internet credit card transaction, and that is programmed to instruct the IP address location interface to obtain user terminal location information that corresponds to the IP address of the user terminal that is associated with the prospective Internet credit card transaction, to instruct the wireless network interface to obtain wireless terminal location information for a wireless terminal that is associated with a user of the credit card for the prospective Internet credit card transaction, to correlate the user terminal location information and the wireless terminal location information, and to generate authorization information for the prospective Internet credit card transaction based on the user terminal location information and the wireless terminal location information that were correlated.

2. An Internet credit card transaction server according to claim 1:

wherein the wireless network interface is further programmed to obtain item identification information for a plurality of items that are linked to a plurality of wireless terminals by short-range, ad-hoc wireless networks; and wherein the Internet credit card transaction authorization processor is further programmed to instruct the wireless network interface to obtain item identification information for an item that is linked to the wireless terminal that is associated with the user of the credit card for the prospective Internet credit card transaction, to correlate the user terminal location information, the wireless terminal location information and the item identification information, and to generate authorization information for the prospective Internet credit card transaction based on the user terminal location information, the wireless terminal location information and the item identification information that were correlated.

3. An Internet credit card transaction server according to claim 2 wherein the Internet credit card transaction authorization processor is programmed to generate authorization information for the prospective Internet credit card transaction that indicates a trustworthiness measure that is proportional to proximity of the user terminal and the wireless terminal to one another and is further proportional to a number of items for which item identification information was obtained.

4. An Internet credit card transaction server according to claim 2 wherein the Internet credit card transaction authorization processor is further programmed to instruct the wireless network interface to obtain the item identification information for the item that is linked to the wireless terminal that is associated with the user of the credit card for the prospective Internet credit card transaction in response to the user terminal and the wireless terminal being sufficiently distant from one another.

5. An Internet credit card transaction server according to claim 2 wherein the Internet credit card transaction authorization processor is further programmed to instruct the wireless network interface to obtain the item identification information for the item that is linked to the wireless terminal that is associated with a user of the credit card for the prospective Internet credit card transaction via the wireless terminal.

6. An Internet credit card transaction server according to claim 1 wherein the Internet credit card transaction authorization processor is programmed to generate authorization information for the prospective Internet credit card transaction that indicates a trustworthiness measure that is proportional to proximity of the user terminal and the wireless terminal to one another.

7. An Internet credit card transaction server according to claim 1 wherein the Internet credit card transaction authorization processor is further programmed to instruct the Internet credit card transaction interface to obtain additional identification information from the user of the credit card if the user terminal location and the wireless terminal are sufficiently distant from one another.

8. An Internet credit card transaction server according to claim 7 wherein the Internet credit card transaction authorization processor is further programmed to instruct the Internet credit card transaction interface to obtain additional identification information from the user of the credit card via the wireless terminal in response to the user terminal and the wireless terminal being sufficiently distant from one another.

9. A credit card transaction server comprising:

a credit card transaction interface that is programmed to receive information about credit card transactions that are associated with a plurality of credit card issuers;

a wireless network interface that is programmed to obtain location information for a plurality of wireless terminals that are associated with a plurality of wireless network providers and to obtain item identification information for a plurality of items that are wirelessly linked by short-range, ad-hoc wireless networks; and a credit card transaction authorization processor that is responsive to receipt of information concerning a prospective credit card transaction with one of the plurality of credit card issuers from the credit card transaction interface, and that is programmed to instruct the wireless network interface to obtain wireless terminal location information for a wireless terminal that is associated with a user of the credit card for the prospective credit card transaction, to obtain item identification information for an item that is associated with the user of the credit card for the prospective credit card transaction and to generate authorization information for the prospective credit card transaction based on the wireless terminal location information and the item identification information.

10. A credit card transaction server according to claim 9 wherein the credit card transaction authorization processor is programmed to generate authorization information for the prospective credit card transaction that indicates a trustworthiness measure that is proportional to proximity of a credit card transaction terminal and the wireless terminal to one another and is further proportional to a number of items for which item identification information was obtained.

11. A credit card transaction server according to claim 10 wherein the credit card transaction authorization processor is further programmed to instruct the wireless network interface to obtain the item identification information for an item that is associated with the user of the credit card for the prospective credit card transaction in response to the credit card transaction terminal location and the wireless terminal being sufficiently distant from one another.

12. A credit card transaction server according to claim 9 wherein the credit card transaction authorization processor is further programmed to instruct the wireless network interface to obtain item identification information for an item that is associated with the user of the credit card for the prospective credit card transaction via the wireless terminal.

13. A credit card transaction authorization method comprising:

using an ad-hoc, short-range wireless link to obtain item identification information from an item that includes an ad-hoc short range wireless link transmitter and that is carried by a user who is associated with a prospective credit card transaction; and generating authorization information for the prospective credit card transaction based on the item identification information that was obtained.

14. A method according to claim 13 further comprising:

obtaining location information for a wireless terminal that is associated with the user; and wherein generating authorization information comprises generating authorization information for the prospective credit card transaction based on the item identification information and the location information that was obtained.

15. A method according to claim 14 further comprising:

obtaining Internet Protocol (IP) address information for a transaction terminal that is associated with the transaction; and wherein generating authorization information comprises generating authorization information for the prospective credit card transaction based on the location information, the item identification information and the IP address information that was obtained.

16. A method according to claim 15 wherein the transaction terminal is a merchant point-of-sale terminal or a user terminal having Internet access.

17. A method according to claim 13 wherein the ad-hoc, short-range wireless link extends between the item and a wireless terminal that is associated with the user, a merchant point-of-sale terminal that is associated with the prospective credit card transaction and/or a terminal having Internet access that is associated with the user.

* * * * *